United States Patent [19]

Hall et al.

[11] Patent Number: 5,075,355

[45] Date of Patent: * Dec. 24, 1991

[54] STABILIZER CONCENTRATE

[75] Inventors: Mark J. Hall; Joseph R. Powers, both of Midland, Mich.

[73] Assignee: The Dow Chemical Company, Midland, Mich.

[*] Notice: The portion of the term of this patent subsequent to Oct. 31, 2006 has been disclaimed.

[21] Appl. No.: 407,167

[22] Filed: Sep. 14, 1989

Related U.S. Application Data

[63] Continuation-in-part of Ser. No. 154,776, Feb. 11, 1988, Pat. No. 4,877,821, Continuation-in-part of Ser. No. 19,169, Feb. 26, 1987, abandoned, Continuation-in-part of Ser. No. 898,174, Aug. 20, 1986, abandoned.

[51] Int. Cl.$^5$ ................................................ C08J 3/22
[52] U.S. Cl. .................................. 523/351; 524/417; 524/427; 524/433; 524/527; 525/57; 525/133; 525/166; 525/196; 525/197
[58] Field of Search ............... 524/425, 426, 427, 433, 524/417, 527; 523/351; 525/57, 133, 166, 196, 197

[56] References Cited

U.S. PATENT DOCUMENTS

| | | | |
|---|---|---|---|
| Re. 29,040 | 11/1976 | Marzolf et al. | |
| 4,102,974 | 7/1978 | Boni | 264/294 |
| 4,124,550 | 11/1978 | Kobayashi et al. | 524/425 |
| 4,160,759 | 7/1979 | Gardner et al. | 524/425 |
| 4,360,489 | 11/1982 | Tusim | |
| 4,373,051 | 2/1983 | Menering | 524/427 |
| 4,387,176 | 6/1983 | Frye | 524/425 |
| 4,418,168 | 11/1983 | Johnson | |
| 4,627,993 | 12/1986 | Loomis | |
| 4,629,596 | 12/1986 | Coffman | 524/425 |

FOREIGN PATENT DOCUMENTS 8711748 1/1987 Japan .

OTHER PUBLICATIONS

Japanese Patent J62011748, English Translation of Abstract, Priority Date Jul. 10, 1985.

*Primary Examiner*—Paul R. Michl
*Assistant Examiner*—Christopher P. Rogers

[57] ABSTRACT

An improved stabilizer concentrate for use in stabilizing polymeric blend compositions which comprise a thermally sensitive interpolymer. The stabilizer concentrate comprises a carrier resin, and a stabilizing agent capable of stabilizing a thermally sensitive interpolymer. The improvement comprises employing a carrier resin having a viscosity such that the stabilizer concentrate has a viscosity of less than 60 percent of the viscosity of the polymeric blend composition.

7 Claims, No Drawings

STABILIZER CONCENTRATE

CROSS-REFERENCE TO COPENDING APPLICATION

This application is a continuation-in-part of application Ser. No. 154,776, now patented 4,877,821 filed Feb. 11, 1988, which is a continuation-in-part of application Ser. No. 019,169, filed Feb. 26, 1987, now abandoned, which is a continuation-in-part of application Ser. No. 898,174, filed Aug. 20, 1986, now abandoned.

BACKGROUND OF THE INVENTION

The present invention concerns an improved stabilizer concentrate for use in polymeric blend compositions. Specifically, the present invention concerns an improved stabilizer concentrate for use in polymeric blend compositions which blend compositions comprise a thermally sensitive polymeric material, particularly, a thermally sensitive interpolymer, for example a vinylidene chloride interpolymer or an ethylene-vinyl alcohol copolymer, and at least one other polymeric component.

Vinylidene chloride interpolymers are well-known in the prior art for their excellent barrier to the mass transport of atmospheric gases and moisture vapor. Because of their excellent barrier properties, vinylidene chloride interpolymers are well suited for use in food packaging operations and other similar operations, wherein it is desirable to protect a given article from oxygen and loss of moisture. Ethylene-vinyl alcohol copolymers (EVOH) are also well-known in the art for their high barrier to the transportation of oxygen. EVOH copolymers are suitable for food packaging in which it is desirable to protect the packaged product from oxygen. Due to their high moisture sensitivity, EVOH copolymers must ordinarily be isolated from moisture in the atmosphere and/or the food product by outer layers of at least one other polymeric component which provides a high barrier with respect to moisture.

In forming containers suitable for use in food packaging applications, it is common to employ a layer of a thermally sensitive barrier polymer in a multi-layer structure, thus providing a structure which is possessed of good oxygen and water vapor barrier properties. For example, it has proven desirable to form barrier containers and films out of a multi-layer structure comprising two outer layers of a polymeric material possessed of desirable processing properties and at least one inner layer of a vinylidene chloride or ethylene-vinyl alcohol interpolymer. Such multi-layer structures may be formed through laminating processes or through a process of coextrusion or other similar process which are well-known in the art.

Processes for forming and using multi-layer structures such as those described above inherently produce a certain amount of scrap material. From an economic standpoint, it is desirable to employ this scrap material in a useful manner. In the past, this has proven difficult since the scrap material comprises a thermally sensitive polymer and at least one other polymer which usually forms the outer layers of the multi-layer structures. Typically, the polymeric material which comprises the non-barrier layers of the multi-layer structure has processing properties which are quite different from the thermally sensitive barrier polymer. Attempts to reprocess or recycle the scrap material have proven to be difficult and somewhat unsatisfactory because reprocessing of the scrap material typically leads to an unacceptable degree of degradation of the thermally sensitive barrier polymer.

SUMMARY OF THE INVENTION

The present invention concerns an improved stabilizer concentrate for use in stabilizing a polymeric blend composition which contains a thermally sensitive polymeric material, particularly an interpolymer, and at least one other polymeric component, the blend containing less than 90 volume percent of the thermally sensitive polymeric material, the stabilizer concentrate comprising a blend of:

(1) a carrier resin, and (2) a stabilizing agent capable of stabilizing the thermally sensitive polymeric material: the concentrate having a viscosity of less than 60 percent of the viscosity of the recycle polymeric blend composition.

Additionally, the present invention concerns an improved process for preparing recyclable polymeric blends containing a thermally sensitive polymeric material, particularly an interpolymer, and at least one other polymeric component. The improved process comprising the steps of intimately admixing the polymeric blend composition with a stabilizer concentrate which comprises a blend of:

(1) a carrier resin, and (2) a stabilizing agent capable of stabilizing a thermally sensitive polymeric material, particularly an interpolymer; wherein the improvement comprises employing a carrier resin having a viscosity such that the stabilizer concentrate has a viscosity of less than 60 percent of the viscosity of the polymeric blend composition.

Stabilizer concentrates of the present invention can be used in processes of the present invention to stabilize polymeric blend compositions, and particularly scrap from multi-layer barrier packaging, for recycling.

DETAILED DESCRIPTION OF THE INVENTION

For the purposes of this invention, it is understood that the term "thermally sensitive polymeric material" refers to any homopolymer or interpolymer which exhibits an undesirable change in properties, particularly physical properties, upon exposure to desirable processing temperatures. In many instances the thermally sensitive polymeric material will be a barrier polymer. Exemplary of suitable barrier polymers are vinylidene chloride interpolymers, ethylene/vinyl alcohol interpolymers (EVOH), polychlorotrifluoroethylene, poly(vinylidene fluoride), poly(ethylene terephthalate), acrylonitrile ($>50$ weight percent)/-styrene copolymers, poly(phenylene oxide), poly(vinyl chloride), and the like. The preferred thermally sensitive barrier polymers are ethylene-vinyl alcohol interpolymers and vinylidene chloride interpolymers. The most preferred thermally sensitive barrier polymers are vinylidene chloride interpolymers.

For the purposes of this invention, it is understood that the term "vinylidene chloride interpolymer" encompasses both homopolymers and interpolymers of vinylidene chloride. The vinylidene chloride interpolymers are suitably formed from a monomer mixture comprising vinylidene chloride in an amount of from 40 to 100 percent, beneficially from 50 to 96 percent, and desirably from 60 to 94 percent by weight of total monomer mixture. When the monomer mixture does not comprise 100 weight percent vinylidene chloride, the monomer mixture comprises one or more monoethylenically unsaturated monomers which are copolymerizable with the vinylidene chloride monomer. The amount of monoethylenically unsaturated monomer is suitably from 0 to 60 weight percent, beneficially from 4 to 50 weight percent, and desirably from 6 to 40 weight percent based on total weight of the monomer mixture.

Monoethylenically unsaturated monomers suitable for copolymerization with vinylidene chloride include vinyl chloride, alkyl acrylates, alkyl methacrylates, acrylic acid, methacrylic acid, itaconic acid, acrylonitrile, and methacrylonitrile. The mono-ethylenically unsaturated monomers are desirably selected from the group consisting of vinyl chloride, alkyl acrylates, and alkyl methacrylates, the alkyl acrylates and alkyl methacrylates having from 1 to 8 carbon atoms per alkyl group. The alkyl acrylates and alkyl methacrylates preferably have from 1 to 4 carbon atoms per alkyl group. The alkyl acrylates and alkyl methacrylates are most preferably selected from the group consisting of methylacrylate, ethylacrylate, and methyl methacrylate.

In one preferred embodiment of the present invention, the vinylidene chloride interpolymer is formed from a monomer mixture which comprises vinylidene chloride in an amount of from 75 to 85 weight percent and vinyl chloride in an amount of from 15 to 25 weight percent based on total weight of the monomer mixture.

In a second preferred embodiment of the present invention, the vinylidene chloride interpolymer is formed from a monomer mixture which comprises vinylidene chloride in an amount of from 92 to 96 weight percent and methylacrylate in an amount of from 4 to 8 weight percent, based on total monomer mixture weight.

Ethylene-vinyl alcohol copolymers may contain any ratio of monomeric units which provides a polymer suitable for barrier packaging. EVOH preferably contains about 20 to 55 mole percent ethylene. It more preferably contains between 25 and 50 mole percent ethylene. Preferably, essentially all other moieties in the EVOH copolymer are vinyl alcohol moieties, although the copolymer may contain negligible amounts of unsaponified vinyl acetate which do not effect the properties of the resulting copolymer. Suitable EVOH copolymers are commercially available, or may be synthesized by saponification of the equivalent ethylene-vinyl acetate copolymer.

The polymeric blend compositions suitably stabilized by the stabilizer concentrates of the present invention comprise at least one polymeric resin other than the thermally sensitive barrier polymers described above. A wide variety of other polymeric resins may be employed in forming the polymeric blend composition. As described above, the polymeric resin other than the thermally sensitive barrier polymer is generally present and selected for its physical properties and processing characteristics. As a general rule, any polymer beneficially used to form multi-layer barrier containers in conjunction with a thermally sensitive barrier polymer is suitably used in the polymeric blend compositions.

The polymeric blend compositions advantageously comprise from 0.5 to 90 volume percent of the thermally sensitive interpolymer, preferably from 2 to 70 volume percent and most preferably from 10 to 40 volume percent.

Polymeric resins suitable for the use in the polymeric blend compositions stabilized by the stabilizer concentrates of the present invention include, for example, the following polymeric resins: polypropylene, polystyrene, polyethylene, polybutylene, interpolymers of two or more α-olefins having from 2 to 18 carbon atoms per molecule, styrene ($>50$ weight percent)/acrylonitrile copolymers, impact modified polystyrene, polyethyleneterephthalate, polycarbonates, and ethylene-vinylacetate copolymers. The polymeric resin other than the thermally sensitive barrier polymer is preferably polypropylene, polyethylene and/or polystyrene.

The stabilizer concentrates of the present invention comprise a blend of:
(1) a carrier resin, and
(2) a stabilizing agent capable of stabilizing a thermally sensitive barrier polymer, wherein the carrier resin has a viscosity such that the stabilizer concentrate has a viscosity of less than 60 percent of the viscosity of the polymeric blend composition.

The viscosity of the polymeric blend composition will generally be between about $1 \times 10^2$ and $1 \times 10^5$ poise measured at 210° C. and as shear rate of 100 sec$^{-1}$. Thus the concentrate, having a viscosity of less than 60 percent of the viscosity of the polymeric blend composition, will have a viscosity of between about $0.6 \times 10^2$ and $6 \times 10^4$ poise measured at 210° C. and at a shear rate of 100 sec$^{-1}$.

The carrier resins suitable for use in forming the stabilizing concentrates of the present invention are those resins other than thermally sensitive barrier polymers previously described, which are suitable for use in forming the polymeric blend compositions. Exemplary of such resins are polypropylene, poly(ethyleneterephthalate), polycarbonates, polystyrene, polyethylene, polybutylene, copolymers of two or more α-olefins, having from 2 to 18 carbon atoms per molecule, styrene/acrylonitrile copolymers, impact modified polystyrenes, polycarbonates, and ethylene-vinylacetate copolymers.

In the present invention, the viscosity of the polymeric blend composition is inversely related to the melt flow rate of the polymer comprising the major portion thereof. The viscosity of the stabilizer concentrate is inversely related to the melt flow rate of the carrier resin. Therefore, by changing the melt flow rate of the carrier resin the viscosity of the stabilizer concentrate changes relative to the viscosity of the polymeric blend composition.

As a general rule, polymers having a relatively high melt flow rate will have a relatively low molecular weight. Polymers having a relatively high melt flow rate, may either be prepared directly through a process which produces a relatively low molecular weight polymer or may be formed by molecular weight degradation of a polymer having a relatively higher molecular weight.

The melt flow rates of polymers are conveniently determined by American Society of Testing and Materials Test Method D-1238. The viscosities of the compositions may be determined by American Society of Testing and Materials Test Method D-1703.

The stabilizing agent suitable for use in the present invention must be capable of stabilizing a thermally sensitive barrier polymer so that the polymer will exhibit a decrease in undesirable physical property changes upon exposure to desirable processing temperatures. Such stabilizing agents are well-known in the prior art. Exemplary of stabilizing agents for poly(- vinylidene chloride) copolymers are tetrasodium-pyrophosphate, magnesium oxide, calcium carbonate and other inorganic salts. When the thermally sensitive barrier polymer is a vinylidene chloride interpolymer, the stabilizing agent is, preferably, tetrasodium-pyrophosphate.

Exemplary stabilizing agents for EVOH include complex metal hydroxides, such as the hydrotalcite-type compounds described in Nohara et al., *Resin Compositions*, Jap. Patent App. 62-11748 (published Jan. 20, 1987), which is incorporated herein by reference. Such compounds preferably conform to the Formula:

$$M_x^{2+}M_y^{3+}(OH)_{2x+3y-2z}(A^{2-})_z \cdot aH_2O$$

wherein:
$M^{2+}$ is a divalent metal ion such as magnesium;
$M^{3+}$ is a trivalent metal ion such as aluminum:
$A^{2-}$ is a divalent anion such as carbonate:
x, y, and z are positive numbers which satisfy the Formula: $8 \geq x/y \geq \frac{1}{4}$ and $z/(x+y) \geq 1/20$; and
a is a number which satisfies the formula: $1 \geq a/(x+y) \geq 0.25$.

A particularly preferred stabilizing agent is that having approximately the average Formula:

$$Mg_{4.5}Al_2(OH)_{13}CO_3 \cdot 3.5H_2O.$$

Some of these stabilizing agents, such as the naturally-occurring mineral hydrotalcite ($Mg_6Al_2(OH)_{16}CO_3 \cdot 4H_2O$), are commercially available, and others can be synthesized by known methods, such as those described in Japanese Patent Shutsugan Kokai Nos. 47-32198, 48-29477 and 48-29478, which are incorporated herein by reference.

Other stabilizing agents for a broad variety of barrier polymers may include known anti-oxidants, for instance, chosen from those described in 2 Encyclopedia Poly. Sci. & Eng., *Antioxidants*. 73 (J. Wiley & Sons 1985), which is incorporated herein by reference.

Methods of forming the blend of a carrier resin and a stabilizing agent are well-known in the prior art. Typically, the carrier resin and the stabilizing agent are blended in the melt using conventional melt processing techniques. Conventional melt processing equipment which may be used includes heated two roll compounding mills, Brabender mixers, Banbury mixers, single screw extruders, twin screw extruders, and the like. It is desirable that the carrier resin and the stabilizing agent be blended under conditions and for a time sufficient to produce a visually homogeneous blend of carrier resin and stabilizing agent.

The stabilizer concentrate of the present invention may comprise other additives and fillers well-known to those skilled in the art. Similarly, a variety of additives may be present in the polymeric blend compositions suitably stabilized by the stabilizer concentrates of the present invention. Exemplary of such additives are plasticizers, heat stabilizers, light stabilizers, pigments, processing aids and lubricants.

The stabilizer concentrates of the present invention suitably comprise carrier resin in an amount of from about 25 to about 75 weight percent and stabilizing agent in an amount of from about 75 to about 25 weight percent, based on total weight of the stabilizer concentrates. Beneficially, the stabilizer concentrates of the present invention comprise carrier resin in an amount of from about 30 to about 60 weight percent and stabilizing agent in an amount of from about 70 to about 40 weight percent based on total weight of the stabilizer concentrates.

The stabilizer concentrates of the present invention and the polymeric blend compositions are melt blended according to conventional melt processing techniques employing typical melt processing equipment. Exemplary of the typical melt processing equipment suitable for use in the present invention are heated two roll compounding mills, Brabender mixers, Banbury mixers, single screw extruders, twin screw extruders, and the like.

The stabilizer concentrates of the present invention are typically blended with the polymeric blend compositions in an amount sufficient to provide from 1 to 10, beneficially, from 1 to 6, and preferably from 2 to 5 weight percent of the stabilizing agent in the blend of stabilizer concentrate and polymeric blend composition. The amount of stabilizing agent present in polymeric blend compositions stabilized according to the present invention is dependent on the composition of the polymeric blend composition and the processing conditions to which said polymeric blend compositions are exposed.

It is desirable that the carrier resin be compatible with the polymer other than the thermally sensitive barrier polymer present in the polymeric blend composition. Those skilled in the art recognize that this allows for better mixing between the stabilizer concentrate and the polymeric blend composition. This is easily accomplished by having the carrier resin be present in the polymeric blend composition. For example, if the polymeric blend composition comprises a vinylidene chloride interpolymer and polypropylene, it is desirable that the carrier resin be polypropylene.

The present invention is illustrated in further detail by the following examples and comparative examples. All parts and percentages are by weight unless otherwise specifically noted.

The following procedure is used to generate the data for all Examples and Comparative Examples.

Stabilizer Concentrate Preparation

A stabilizer concentrate is prepared by melt blending 67 weight percent of tetrasodiumpyrophosphate with 33 weight percent of a polypropylene resin. The melt blending occurs in a Leistritz twin screw extruder. The stabilizer concentrate is extruded into a strand, cooled in a water bath, pelletized, and dried.

Four stabilizer concentrates are prepared. The concentrates are identical except that in each of the four concentrates a different polypropylene is used. The polypropylenes differ in viscosity. Table I sets forth the stabilizer concentrate number, the melt flow rate of the polypropylene employed therein, and the viscosity of the stabilizer concentrate.

TABLE I

| Stabilizer Concentrate Number | MFR[1] of Polypropylene | Viscosity[2] |
|---|---|---|
| 1* | 35 | 8.5 × 10³ |
| 2 | 100 | 2.8 × 10³ |
| 3 | 325 | 3.0 × 10³ |

TABLE I-continued

| Stabilizer Concentrate Number | MFR[1] of Polypropylene | Viscosity[2] |
|---|---|---|
| 4 | 450 | $4.1 \times 10^3$ |

*Not an example of the present invention.
[1]Melt flow rate as determined by American Society of Testing and Materials Test Method D-1238, in grams per 10 minutes.
[2]Viscosity, in poise, at 210° C. according to American Society of Testing and Materials test Method D-1703, at a shear rate of 100 seconds-1.

Data Generation

A five layer, coextruded structure is prepared. The five layer structure has a central barrier layer having two generally planar, generally parallel outer surfaces. Disposed on each of the generally planar, generally parallel outer surfaces of the central barrier layer is an adhesive layer, each adhesive layer having disposed thereon an outer skin layer.

The specific composition of the central barrier layer varies and is set forth in Table II.

TABLE II

| Barrier Layer Number | Composition |
|---|---|
| 1 | A vinylidene chloride/vinyl chloride copolymer formed from a monomer mixture comprising 80 weight percent vinylidene chloride and 20 weight percent vinyl chloride, based on total monomer mixture weight. |
| 2 | A vinylidene chloride/methyl acrylate copolymer formed from a monomer mixture comprising 94 weight percent vinylidene chloride and 6 weight percent methylacrylate, based on total monomer mixture weight. |

The adhesive layer comprises a blend of an ethylene/vinyl acetate copolymer with polypropylene. The adhesive composition comprises 70 weight percent of the ethylene/vinyl acetate copolymer and 30 weight percent of polypropylene, based on total adhesive composition weight. The adhesive is available from A. Schulman Inc. The outer skin layer is formed from polypropylene commercially available from Exxon, Inc. under the trade designation Exxon 4092. The polypropylene has a melt flow rate of 2.5.

The five layer structure comprises 86 volume percent polypropylene, split equally between the two outer skin layers, four volume percent of the adhesive split equally between the two adhesive layers, and ten volume percent of the barrier layer material.

Data generated from the five layer structure described above constitutes Pass No. 0, and acts as a reference point as it contains no stabilizer concentrate and no scrap.

The five layer structure prepared as described above is then ground in a granulator to produce recycle material in the form of flakes. The recycle material thus prepared is then incorporated into a seven layer coextruded structure. The seven layer coextruded structure comprises a central barrier layer having two generally parallel, generally planar outer surfaces, said outer surfaces having disposed thereon an adhesive layer, the outer surfaces of each adhesive layer having disposed thereon a recycle layer, the outer surface of each recycle layer having disposed thereon an outer skin layer.

The composition of the central barrier layer, the adhesive layers and the outer skin layers are the same as set forth above in connection with the five layer structure. Except for the addition of the stabilizer concentrate, the recycle layer employed has the same composition of the entire five layer structure previously described. That is, the five layer structure of Pass No. 0 is ground into flakes and serves as the recycle layer of the seven layer structure just described. This seven layer structure constitutes Pass No. 1.

The recycle stream has blended therewith, prior to being extruded into the seven layer structure, 4.5 weight percent of a stabilizer concentrate according to the present invention. The seven layer structure comprises ten volume percent of the central barrier layer, four volume percent of the adhesive layer, split equally between the two adhesive layers, 50 volume percent of the recycle material, split equally between the two recycle layers, and 36 volume percent of the polypropylene, split equally between the two outer skin layers.

In a similar manner, six more seven layer coextruded structures are prepared as described above (Pass Nos. 2-7) with the only difference being that the recycle layer in each of the seven layer structures has the same composition as the seven layer structure designated by the preceding Pass Number with the exception of the addition of stabilizer concentrate. That is, the recycle layer of Pass No. 4 has the same composition as the entire seven layer structure of Pass No. 3; and the recycle layer of Pass No. 5 has the same composition as the entire seven layer structure of Pass No. 4, except each of the recycle layers has blended therewith, prior to being extruded into the seven layer structure, 4.5 weight percent of a stabilizer concentrate according to the present invention.

The viscosity of the recycle layer in each pass remains approximately the same and is about $7.5 \times 10^3$ poise at a temperature of 210° C. and a shear rate of 100 sec$^{-1}$. Other test methods may be employed, it being only necessary that the viscosity ratios meet the requirement that the viscosity of the concentrate be less than 60 percent the viscosity of the blend.

Determination of Color Change

Each of the seven layer structures designated by a separate Pass No. is compared with the initial five layer structure to determine the color change between the initial five layer structure and the seven layer structure. The degree of color change is an indication of the degradation occurring in the recycle layers caused by exposure to excessive heat during processing of the polymer. The color change is determined by the Hunter Color Index as set forth in the American Society of Testing and Materials Test Method D-2244-79 as described in more detail by Richard S. Hunter, in "Photoelectric Color Difference Meter," Volume 48 of the *Journal of the Optical Society of America*, pages 985-995, December, 1958. As described in the cited references, the total color change is designated by $\Delta E_{a,b}$.

EXAMPLES AND COMPARATIVE EXAMPLES

The total color change and specific compositions tested are set forth in Table III.

TABLE III

| Run Number | Stabilizer Concentrate Number[1] | Barrier Layer Number[2] | $\Delta E_{a,b}$ of Pass Number: | | | | | | | |
|---|---|---|---|---|---|---|---|---|---|---|
| | | | 0* | 1 | 2 | 3 | 4 | 5 | 6 | 7 |
| 1* | 1 | 1 | N/A | 23.9 | 35.4 | 40.9 | 44.8 | 48.4 | 47.6 | 46.9 |
| 2 | 3 | 1 | N/A | 15.9 | 30.5 | 38.9 | 39.9 | 42.3 | 45.1 | 43.2 |
| 3 | 3 | 2 | N/A | 25.2 | 34.6 | 41.4 | 45.4 | 46.9 | 49.2 | 50.3 |
| 4* | 1 | 2 | N/A | 27.0 | 35.4 | 45.6 | 52.0 | 53.7 | 54.9 | 55.3 |

*Not an example of the present invention.
[1] From Table I
[2] From Table II
N/A Not applicable, Pass No. 0 comprises a five layer structure containing no recycle, and functions as a reference.

In order to determine the effect of the viscosity of the carrier resin on stabilizer concentrate efficiency, $\Delta E_{a,b}$ data is generated for Pass No. 7 of a seven layer structure as described above, wherein carrier resins having different melt flow rates are employed. The exact compositions used and results are set forth in Table IV.

TABLE IV

| Run No. | Stabilizer Concentrate No.[1] | Barrier Layer No.[2] | $\Delta E_{a,b}$ Pass No. 7 | Viscosity Ratio[3] |
|---|---|---|---|---|
| 4* | 1 | 1 | 28.9 | 1.13 |
| 5 | 2 | 1 | 20.6 | 0.37 |
| 6 | 3 | 1 | 20.3 | 0.4 |
| 7 | 4 | 1 | 19.6 | 0.55 |

*Not an example of the present invention.
[1] From Table I
[2] From Table II
[3] Stabilizer concentrate viscosity (Table I) divided by recycle layer viscosity (7.5 × $10^3$ poise, at a shear rate of 100 seconds$^{-1}$).

As can be seen from the above results, employing a carrier resin having a melt flow rat such that the stabilizer concentrate has a viscosity of less than 60 percent of the viscosity of the polymeric blend compositions (viscosity ratio less than 0.6) produces a stabilizer concentrate having greatly improved efficiency.

What is claimed is:

1. An improved process for stabilizing a polymeric blend composition which comprises a thermally sensitive interpolymer chosen from the group consisting of vinylidene chloride interpolymers and ethylene/vinyl alcohol interpolymers, and a second polymer other than a vinylidene chloride interpolymer or an ethylene-vinyl acetate interpolymer, wherein the process comprises forming an intimate admixture of the polymeric blend composition and a stabilizing concentrate which stabilizing concentrate comprises a blend of: (1) a carrier resin, and (2) a stabilizing agent capable of stabilizing a thermally sensitive interpolymer, wherein the improvement comprises employing a carrier resin having a viscosity such that the stabilizer concentrate has a viscosity of less than 60 percent of the viscosity of the polymeric blend composition.

2. The improved process of claim 1, wherein the carrier resin is selected from the group consisting of polypropylene, polyethylene, polystyrene, and impact modified polystyrene.

3. The improved process of claim 1, wherein the thermally sensitive interpolymer comprises an ethylene-vinyl alcohol copolymer.

4. The improved process of claim 3, wherein the stabilizing agent is selected from the group consisting of hydrotalcite-type complex metal hydroxides.

5. The improved process of claim 3, wherein the second polymer of the polymeric blend composition is selected from the group consisting of polypropylene, polyethylene, polystyrene, and impact modified polystyrene.

6. The improved process of claim 1, wherein the stabilizer concentrate comprises a carrier resin in an amount of from about 25 to about 75 weight percent and a stabilizing agent in an amount of from about 25 to about 75 weight percent based on total weight of the stabilizer concentrate.

7. The improved process of claim 5, wherein the stabilizer concentrate comprises a carrier resin in an amount of from about 30 to about 60 weight percent and a stabilizing agent in an amount of from about 70 to about 40 weight percent based on total weight of the stabilizer concentrate.

* * * * *

UNITED STATES PATENT AND TRADEMARK OFFICE
CERTIFICATE OF CORRECTION

PATENT NO. : 5,075,355

DATED : December 24, 1991

INVENTOR(S) : Mark J. Hall and Joseph R. Powers, both of Midland, MICH

It is certified that error appears in the above-identified patent and that said Letters Patent is hereby corrected as shown below:

Column 9, line 45, delete " ethylene-vinyl " and insert
-- ethylene/vinyl --.

Column 9, line 46, delete " acetate " and insert -- alcohol --.

Signed and Sealed this

Seventeenth Day of August, 1993

Attest:

BRUCE LEHMAN

Attesting Officer    Commissioner of Patents and Trademarks